United States Patent
Xie et al.

(10) Patent No.: US 11,210,127 B2
(45) Date of Patent: Dec. 28, 2021

(54) METHOD AND APPARATUS FOR PROCESSING REQUEST

(71) Applicant: Beijing Baidu Netcom Science and Technology Co., Ltd., Beijing (CN)

(72) Inventors: Yongji Xie, Beijing (CN); Wen Chai, Beijing (CN); Yu Zhang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 216 days.

(21) Appl. No.: 16/458,337

(22) Filed: Jul. 1, 2019

(65) Prior Publication Data

US 2020/0097314 A1 Mar. 26, 2020

(30) Foreign Application Priority Data

Sep. 21, 2018 (CN) .......................... 201811106831.1

(51) Int. Cl.
*G06F 9/455* (2018.01)

(52) U.S. Cl.
CPC .. *G06F 9/45558* (2013.01); *G06F 2009/4557* (2013.01); *G06F 2009/45575* (2013.01)

(58) Field of Classification Search
CPC ....... G06F 9/45558; G06F 2009/45575; G06F 9/4843; G06F 2209/5018
See application file for complete search history.

(56) References Cited

U.S. PATENT DOCUMENTS

| 9,778,962 B2 | 10/2017 | Jang et al. |
| 9,852,008 B2 | 12/2017 | Tamura et al. |
| 10,713,074 B2 | 7/2020 | Li |
| 2004/0015966 A1* | 1/2004 | MacChiano ............ H04L 69/32 718/1 |

(Continued)

FOREIGN PATENT DOCUMENTS

| CN | 102591715 A | 7/2012 |
| CN | 103116517 A | 5/2013 |

(Continued)

OTHER PUBLICATIONS

Zhang et al., "High Performance and Scalable Virtual Machine Storage I/O Stack for Multicore Systems", 2017 IEEE 23rd International Conference on Parallel and Distributed Systems, 2017, pp. 292-301.

*Primary Examiner* — Dong U Kim
(74) *Attorney, Agent, or Firm* — The Webb Law Firm

(57) ABSTRACT

Embodiments of the present disclosure disclose a method and apparatus for processing a request. A specific embodiment of the method includes: acquiring, in response to start-up of a virtual machine, work queue quantity information of each device of the virtual machine, the work queue quantity information indicating a quantity of work queues of a device bound with a processing thread corresponding to the device of the virtual machine, the quantity being one or more; and creating, based on the work queue quantity information of the each device of the virtual machine, processing threads corresponding to the each device of the (Continued)

virtual machine respectively, the processing thread corresponding to the device of the virtual machine being used to process an access request for the device of the virtual machine in the work queue of the device bound with the processing thread.

9 Claims, 5 Drawing Sheets

(56) References Cited

U.S. PATENT DOCUMENTS

| | | | |
|---|---|---|---|
| 2012/0151472 A1* | 6/2012 | Koch | G06F 9/45558 718/1 |
| 2013/0247056 A1* | 9/2013 | Hattori | G06F 9/4843 718/102 |
| 2015/0169341 A1* | 6/2015 | Gulati | G06F 3/067 718/1 |
| 2016/0239331 A1 | 8/2016 | Tamura et al. | |
| 2016/0335135 A1 | 11/2016 | Jang et al. | |
| 2017/0322828 A1* | 11/2017 | Panicker | G06F 9/45545 |
| 2018/0102904 A1* | 4/2018 | Lin | H04L 9/3268 |
| 2018/0365160 A1* | 12/2018 | Jiang | G06F 9/45558 |

FOREIGN PATENT DOCUMENTS

| | | |
|---|---|---|
| CN | 107209681 A | 9/2017 |
| JP | 2015197874 A | 11/2015 |
| JP | 2016151852 A | 8/2016 |
| KR | 1020070092559 A | 9/2007 |
| KR | 101638136 B1 | 7/2016 |

\* cited by examiner

METHOD AND APPARATUS FOR PROCESSING REQUEST

CROSS-REFERENCE TO RELATED APPLICATION

This application claims priority to Chinese Application No. 201811106831.1 filed Sep. 21, 2018, the disclosure of which is hereby incorporated by reference in its entirety.

TECHNICAL FIELD

The present disclosure relates to the field of computers, specifically to the field of virtual machines, and more specifically to a method and apparatus for processing a request.

BACKGROUND

In a cloud computing environment, a Virtio device having multiple work queues has been widely used. How to improve the I/O performance of the Virtio device having multiple work queues has always been the focus of research in the field of cloud computing.

SUMMARY

Embodiments of the present disclosure provide a method and apparatus for processing a request.

In a first aspect, the embodiments of the present disclosure provide a method for processing a request, the method including: acquiring, in response to start-up of a virtual machine, work queue quantity information of each device of the virtual machine, the work queue quantity information indicating a quantity of work queues of a device bound with a processing thread corresponding to the device of the virtual machine, the quantity being one or more; and creating, based on the work queue quantity information of the each device of the virtual machine, processing threads corresponding to the each device of the virtual machine respectively, the processing thread corresponding to the device of the virtual machine being used to process an access request for the device of the virtual machine in the work queue of the device bound with the processing thread.

In a second aspect, the embodiments of the present disclosure provide an apparatus for processing a request, the apparatus including: an acquisition unit, configured to acquire, in response to start-up of a virtual machine, work queue quantity information of each device of the virtual machine, the work queue quantity information indicating a quantity of work queues of a device bound with a processing thread corresponding to the device of the virtual machine, the quantity being one or more; and a creation unit, configured to create, based on the work queue quantity information of the each device of the virtual machine, processing threads corresponding to the each device of the virtual machine respectively, the processing thread corresponding to the device of the virtual machine being used to process an access request for the device of the virtual machine in the work queue of the device bound with the processing thread.

According to the method and apparatus for processing a request, provided by the embodiments of the present disclosure, work queue quantity information of each device of a virtual machine is acquired in response to start-up of the virtual machine, the work queue quantity information indicating the quantity of work queues of a device bound with a processing thread corresponding to the device of the virtual machine, the quantity being one or more; and processing threads corresponding to each device of the virtual machine are respectively created based on the work queue quantity information of the each device of the virtual machine, and the processing thread corresponding to the device of the virtual machine is used to process an access request for the device of the virtual machine in the work queue of the device bound with the processing thread. For different devices of the virtual machine, the quantity of work queues bounded with I/O threads of the devices is adjusted to improve the I/O performance of the devices of the virtual machine, thereby improving the I/O performance of the entire system.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
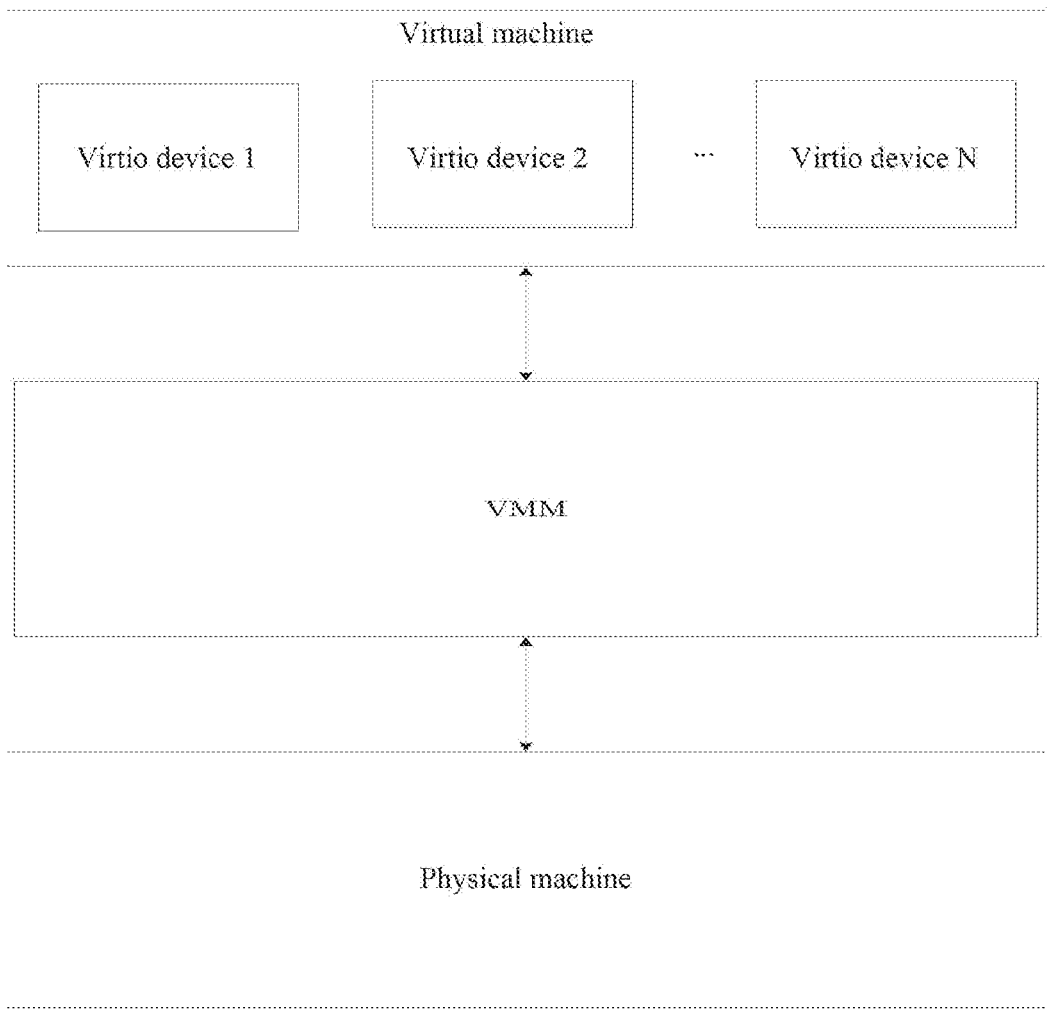
FIG. 1 shows an exemplary system architecture in which embodiments of the present disclosure may be implemented.

Referring to FIG. 1, an exemplary system architecture in which the embodiments of the present disclosure may be implemented is shown.

A virtual machine may include a plurality of devices, and a device of the virtual machine may be a network card or a disk of the virtual machine. Each device of the virtual machine has a work queue. Each device of the virtual machine may have a plurality of work queues. An access request for a device of the virtual machine may be referred to as an I/O request for the device of the virtual machine. Each time an I/O request for a device of the virtual machine is generated, the I/O request for the device of the virtual machine is added to the work queue of the device. A processing thread for processing the I/O request for the device of the virtual machine may be created by a VMM (Virtual Machine Monitor) on a physical machine, and the processing thread may also be referred to as an I/O thread.

During the processing of the I/O request for the device of the virtual machine, data may be transmitted between the physical machine and the virtual machine through a Virtio framework. The devices of the virtual machine may be referred to as Virtio devices.

Figure 2:
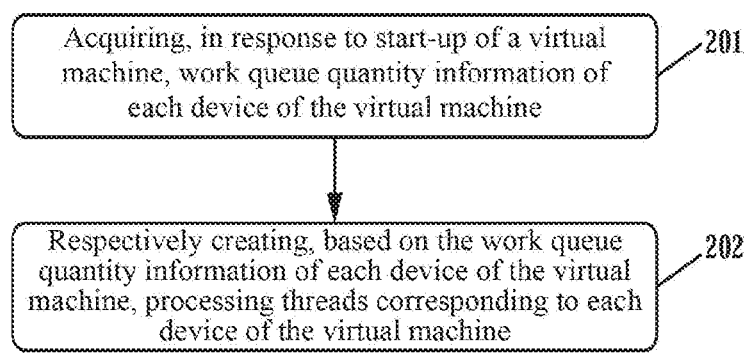
FIG. 2 shows a flowchart of an embodiment of a method for processing a request according to the present disclosure.

Referring to FIG. 2, a flowchart of an embodiment of a method for processing a request according to the present disclosure is shown. The method includes the following steps.

Step 201: work queue quantity information of each device of a virtual machine is acquired in response to start-up of the virtual machine.

In this embodiment, when a virtual machine is started, work queue quantity information of each device of the virtual machine may be acquired respectively in response to start-up of the virtual machine. A device of the virtual machine may have a plurality of work queues. A processing thread corresponding to the device of the virtual machine, i.e., an I/O thread, is used to process an access request for the device, i.e., an I/O request for the device. The work queue quantity information of the device of the virtual machine indicates the quantity of work queues of the device of the virtual machine corresponding to one processing thread corresponding to the device, and the quantity may be one or more. In other words, the work queue quantity information of the device of the virtual machine indicates how many I/O requests for the device in device objects of the device are processed by one processing thread corresponding to the device.

Step 202: processing threads corresponding to each device of the virtual machine are respectively created based on the work queue quantity information of each device of the virtual machine.

In this embodiment, processing threads corresponding to each device of the virtual machine may be respectively created based on the work queue quantity information of each device of the virtual machine. Respective I/O threads corresponding to each device of the virtual machine may be respectively created using a VMM based on the work queue quantity information of each device of the virtual machine.

For one device of the virtual machine, when the work queue quantity information of the device indicates that the quantity of work queues of the device bound with one I/O thread corresponding to the device is one, I/O threads corresponding to the device in the same quantity as the quantity of work queues of the device may be created, and each I/O thread corresponding to the device is used to process an I/O request for the device in the work queue corresponding to the processing thread. When the work queue quantity information of the device indicates that the quantity of work queues of a device bound with one processing thread corresponding to the device is N and N>1, a plurality of I/O threads are created, and the quantity of work objects, bound with each I/O thread, of the device may be N.

In this embodiment, after the I/O threads corresponding to each device of the virtual machine are respectively created, the corresponding I/O threads of each device may be used to process I/O requests in the respective work queues. When the I/O threads corresponding to one device process the I/O requests in the work queues, the work queues may be accessed by polling. When a certain work queue is empty, or the quantity of I/O requests in a certain work queue to be processed by the I/O threads is greater than a load balancing threshold, the I/O request in next work queue is processed.

In this embodiment, for different devices of the virtual machine, the quantity of work queues bounded with one I/O thread corresponding to the devices may be adjusted to improve the I/O performance of the system.

In some optional implementations of this embodiment, the quantity in the work queue quantity information of one device of the virtual machine may be a preset quantity corresponding to the device type of the device. In other words, one device type corresponds to a preset quantity. Each device type has a corresponding quantity in advance. For example, a network card type corresponds to a quantity 1 in advance. For all devices of the network card type of the virtual machine, that is, for all network cards, the quantity of work queues of each device of the virtual machine corresponding to one I/O thread corresponding to each network card is 1. A hard disk type corresponds to a quantity N in advance, N>1. For each device of the hard disk type of the virtual machine, that is, for each hard disk, the quantity of work queues of the hard disk bound with one I/O thread may be N. For example, if the device is a disk, the quantity of work queues of the disk is 9 and N=3, three I/O threads corresponding to the disk may be created, and each I/O thread corresponding to the disk is bound with 3 work queues of the disk respectively.

In some optional implementations of this embodiment, the preset quantity information corresponding to a device type is determined by pre-testing. When determining a preset quantity corresponding to a device type, a device of this device type may be used for test. For each candidate quantity, a corresponding quantity of I/O threads corresponding to the device of the device type is created according to the candidate quantity during each test. Each test is performed under the same preset test condition. The same preset test condition may be the same quantity of I/O requests in the work queues of the device that need to be processed within the same duration. For each candidate quantity, the processor utilization of the device, that is, the CPU utilization, is determined under the same preset test condition to obtain the processor utilization corresponding to each candidate quantity. Then, the candidate quantity having the highest processor utilization may be used as the preset quantity corresponding to the device type. In other words, it is equivalent to determining in which preset quantity the corresponding threads are created in the same test environment such that the processor utilization is the highest.

For example, when determining a preset quantity corresponding to a device type, a test is completed by using a device of the device type, and the candidate quantity includes 1, 2, 3, or 4. A candidate quantity is selected for each test. In each test, a corresponding quantity of I/O threads corresponding to the device of the device type is created according to the selected candidate quantity. When the selected candidate quantity is 1, a corresponding quantity of I/O threads corresponding to the device of the device type is created, and each I/O thread is bound with a work queue of the device. When the selected candidate quantity is 2, a corresponding quantity of I/O threads corresponding to the device of the device type is created, and each I/O thread is bound with two work queues of the device. When the selected candidate quantity is 3, a corresponding quantity of I/O threads corresponding to the device of the device type is created, and each I/O thread is bound with three work queues of the device. Each test is performed under the same preset test condition. The processor utilization corresponding to each candidate quantity is determined respectively under the same preset test condition. Suppose the processor utilization is the highest when the quantity of work queues of the device bound with a I/O thread corresponding to the device is determined under the same test condition to be 3, then the preset quantity corresponding to the device type is 3.

In some optional implementations of this embodiment, the preset quantity corresponding to a device type may be adjusted according to an adjustment instruction, and the configuration instruction may be generated at a user terminal. For example, if the user is an operation and maintenance engineer, the operation and maintenance engineer may input a device type identifier of a device type of a corresponding preset quantity that needs to be adjusted and a configuration quantity indicating the adjusted preset quantity corresponding to the device type in a management interface of the terminal. A configuration instruction may be generated, and the configuration instruction includes: the device type identifier and the configuration quantity. Then, the configuration instruction sent by the terminal of the operation and maintenance engineer may be received. A server may determine, based on the device type identifier and the configuration quantity in the configuration instruction, the device type identifier of the device type of the corresponding preset quantity to be adjusted and the configuration quantity indicating the adjusted preset quantity corresponding to the device type, and use the configuration quantity as a preset quantity corresponding to the device type having the device type identifier.

Figure 3:
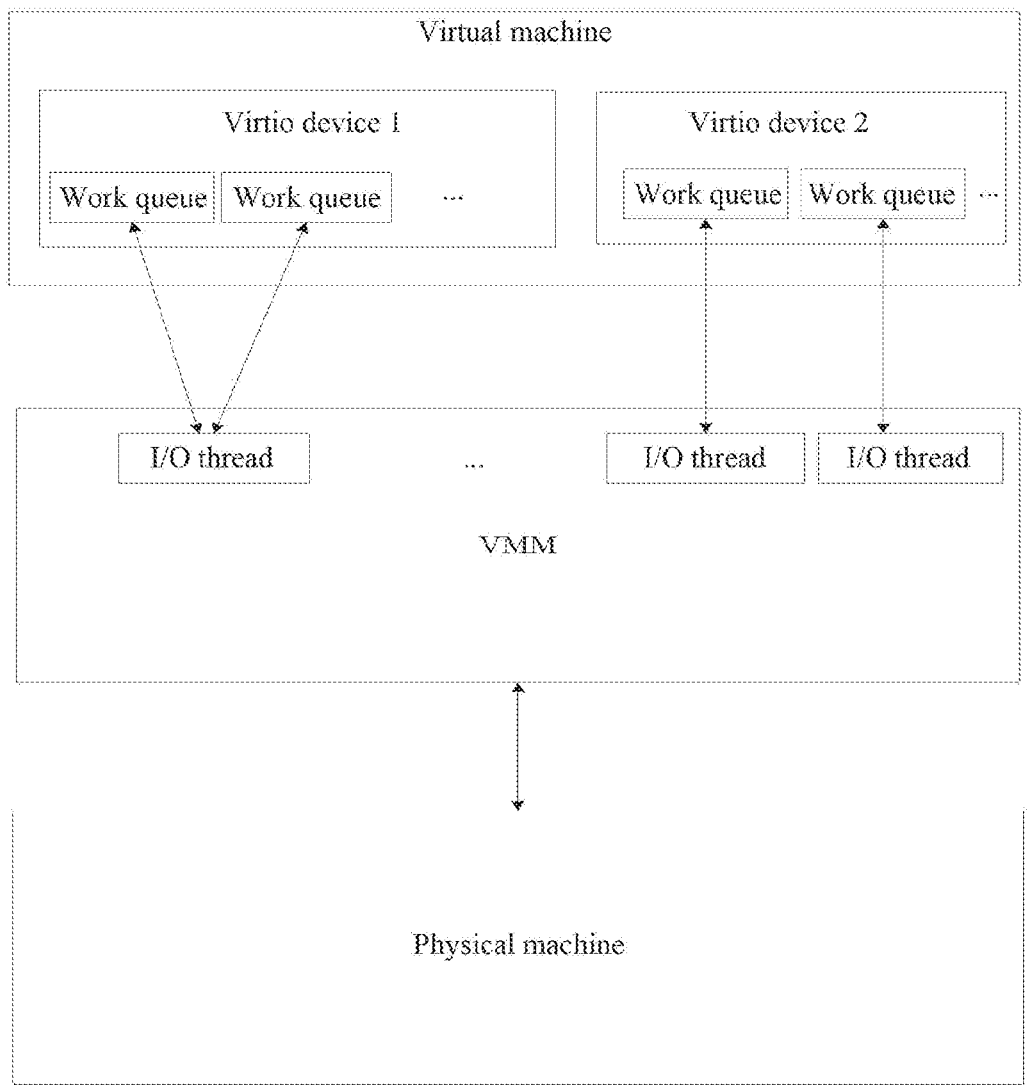
FIG. 3 shows a schematic effect diagram of a binding relationship between I/O threads and work queues corresponding to devices of a virtual machine.

Please referring to FIG. 3, a schematic effect diagram of a binding relationship between I/O threads and work queues corresponding to devices of a virtual machine is shown.

The devices of the virtual machine include Virtio device 1 and Virtio device 2. Both Virtio device 1 and Virtio device 2 have a plurality of devices, and each device has a plurality of work queues. An I/O request for the Virtio device 1 is added to work queues of the Virtio device 1. An I/O request for the Virtio device 2 is added to work queues of the Virtio device 2. I/O threads for processing the I/O requests in the work queues of the Virtio device 1 and the Virtio device 2 are respectively created by a VMM.

For the Virtio device 1, each I/O thread corresponding to the Virtio device 1 is bound with two work queues of the Virtio device 1, that is, one I/O thread corresponding to the Virtio device 1 is used to process the I/O requests for the Virtio device 1 in the two work queues of the Virtio device 1. For the Virtio device 2, each I/O thread corresponding to the Virtio device 2 is bound with one work queue of the Virtio device 2, that is, one I/O thread corresponding to the Virtio device 2 is used to process the I/O request for the Virtio device 2 in the one work queue of the Virtio device 2.

Figure 4:
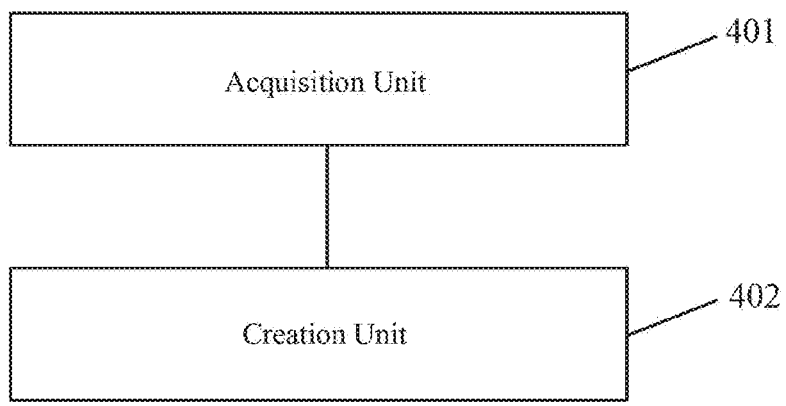
FIG. 4 shows a schematic structural diagram of an embodiment of an apparatus for processing a request according to the present disclosure.

Please refer to FIG. 4, as an implementation of the method shown in the above figures, the present disclosure provides an embodiment of processing a request, and the embodiment of the apparatus corresponds to the embodiment of the method shown in FIG. 2.

As shown in FIG. 4, the apparatus for processing a request according to the present embodiment includes: an acquisition unit 401 and a creation unit 402. The acquisition unit 401 is configured to acquire, in response to start-up of a virtual machine, work queue quantity information of each device of the virtual machine, the work queue quantity information indicates a quantity of work queues of a device bound with a processing thread corresponding to the device of the virtual machine, and the quantity is one or more; and the creation unit 402 is configured to create, based on the work queue quantity information of the each device of the virtual machine, processing threads corresponding to the each device of the virtual machine respectively, and the processing thread corresponding to the device of the virtual machine is used to process an access request for the device of the virtual machine in the work queue of the device bound with the processing thread.

In some optional implementations of this embodiment, the quantity of work queues of the device bound with the processing thread corresponding to the device of the virtual machine, indicated by the work queue quantity information of the virtual machine, is a preset quantity corresponding to a device type of the device.

In some optional implementations of this embodiment, the apparatus for processing a request further includes: a preset quantity determination unit, configured to create, for each candidate quantity for determining the preset quantity corresponding to the device type, processing threads corresponding to a device of the device type based on the candidate quantity; acquire a processor utilization of the device under a preset test condition, and use the acquired processor utilization as a processor utilization corresponding to the candidate quantity, wherein the created processing thread is used to process an access request for the device in the work queue of the device under the preset test condition; and use the candidate quantity corresponding to the highest processor utilization as the preset quantity corresponding to the device type.

In some optional implementations of this embodiment, the apparatus for processing a request further includes: a configuration unit, configured to receive a configuration instruction, the configuration instruction includes a device type identifier and a configuration quantity, and the configuration instruction is generated based on a user's configuration operation; and use the configuration quantity as the preset quantity corresponding to the device type having the device type identifier.

Figure 5:
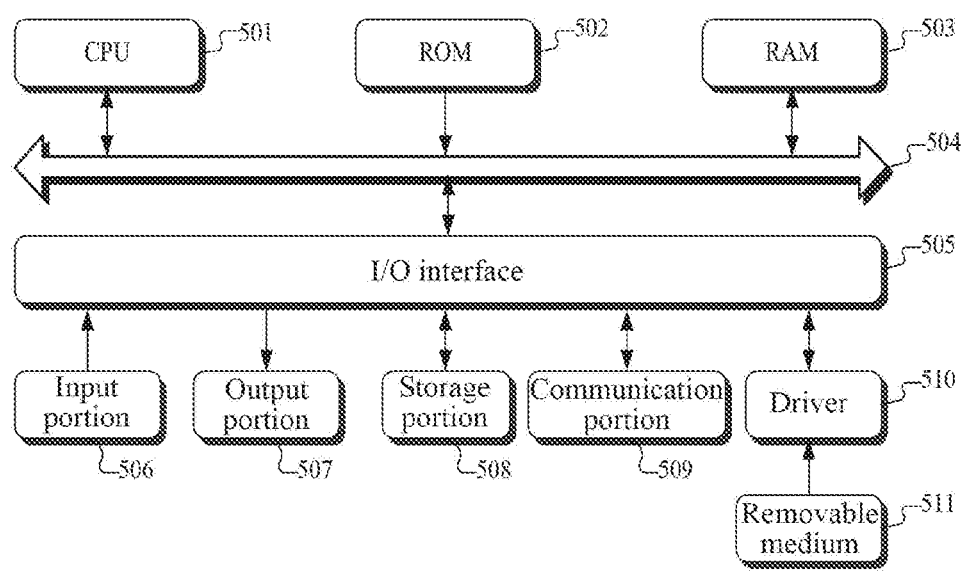
FIG. 5 shows a schematic structural diagram of a computer system of an electronic device adapted to implement the embodiments of the present disclosure.

Referring to FIG. 5, a schematic structural diagram of a computer system 500 adapted to implement an electronic device of the embodiments of the present disclosure is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506; an output portion 507; a storage portion 508 including a hard disk or the like; and a communication portion 509 including a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, so that a computer program read therefrom is installed on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program includes program codes for executing the method as illustrated in the flow chart. In such an embodiment, the computer program may be downloaded and installed from a network via the communication portion 509, and/or may be installed from the removable medium 511. The computer program, when executed by the CPU 501, implements the functions as defined by the methods of the present disclosure.

The present disclosure further discloses an electronic device, the electronic device is configured with one or more processors; and a storage device, configured to store one or more programs, the one or more programs may include instructions for performing the operations described in the above embodiments. When the one or more programs are executed by the one or more processors, the one or more processors perform the operations described in the above embodiments.

The present disclosure further discloses a computer readable storage medium the computer readable storage medium may be included in the electronic device, or a stand-alone computer readable medium not assembled into the electronic device. The computer readable storage medium stores one or more programs, and when the one or more programs are executed by the electronic device, the electronic device performs the operations described in the above embodiments.

It should be noted that the computer readable medium in the present disclosure may be computer readable signal medium or computer readable storage medium or any combination of the above two. An example of the computer readable storage medium may include, but is not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any tangible medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for processing a request, comprising:
   acquiring, in response to start-up of a virtual machine, work queue number information of each device of the virtual machine, the work queue number information indicating a number of work queues of the device bound with a processing thread corresponding to the device of the virtual machine, the number of work queues being one or more; and
   creating, based on the work queue number information of the device of the virtual machine, processing threads corresponding to the each device of the virtual machine respectively, the processing threads corresponding to the device of the virtual machine being used to process an access request for the device of the virtual machine in the work queues of the device bound with the processing threads.

2. The method according to claim 1, the number of work queues of the device bound with the processing threads corresponding to the device of the virtual machine, indicated by the work queue number information, is a preset number corresponding to a device type of the device.

3. The method according to claim 2, the method further comprising:
   creating, for each candidate number for determining the preset number corresponding to the device type, processing threads corresponding to a device of the device type based on the candidate number; acquiring a processor utilization of a device under a preset test condition, and using the acquired processor utilization as a processor utilization corresponding to the candidate number, wherein the created processing threads are used to process an access request for the device in the work queues of the device under the preset test condition; and
   using a candidate number corresponding to the highest processor utilization as the preset number corresponding to the device type.

4. The method according to claim 3, the method further comprising:

receiving a configuration instruction, wherein the configuration instruction includes a device type identifier and a configuration number, and the configuration instruction is generated based on a user's configuration operation; and using the configuration number as the preset number corresponding to a device type having the device type identifier.

5. An apparatus for processing a request, comprising:

at least one processor; and a memory storing instructions, the instructions when executed by the at least one processor, cause the at least one processor to perform operations, the operations comprising:

acquiring, in response to start-up of a virtual machine, work queue number information of each device of the virtual machine, the work queue number information indicating a number of work queues of the device bound with a processing thread corresponding to the device of the virtual machine, the number of work queues being one or more; and creating, based on the work queue number information of the device of the virtual machine, processing threads corresponding to the device of the virtual machine respectively, the processing thread corresponding to the device of the virtual machine being used to process an access request for the device of the virtual machine in the work queues of the device bound with the processing threads.

6. The apparatus according to claim 5, the number of work queues of the device bound with the processing threads corresponding to the device of the virtual machine, indicated by the work queue number information, is a preset number corresponding to a device type of the device.

7. The apparatus according to claim 6, the operations further comprising:

creating, for each candidate number for determining the preset number corresponding to the device type, processing threads corresponding to a device of the device type based on the candidate number; acquiring a processor utilization of a device under a preset test condition, and using the acquired processor utilization as a processor utilization corresponding to the candidate number, wherein the created processing threads are used to process an access request for the device in the work queues of the device under the preset test condition; and using a candidate number corresponding to the highest processor utilization as the preset number corresponding to the device type.

8. The apparatus according to claim 7, the operations further comprising:

receiving a configuration instruction, wherein the configuration instruction includes a device type identifier and a configuration number, and the configuration instruction is generated based on a user's configuration operation; and using the configuration number as a preset number corresponding to a device type having the device type identifier.

9. A non-transitory computer readable storage medium, storing a computer program thereon, wherein the computer program, when executed by a processor, causes the processor to perform operations, the operations comprising:

acquiring, in response to start-up of a virtual machine, work queue number information of each device of the virtual machine, the work queue number information indicating a number of work queues of the device bound with a processing thread corresponding to the device of the virtual machine, the number of work queues being one or more; and creating, based on the work queue number information of the device of the virtual machine, processing threads corresponding to the device of the virtual machine respectively, the processing thread corresponding to the device of the virtual machine being used to process an access request for the device of the virtual machine in the work queues of the device bound with the processing threads.

* * * * *